(12) United States Patent
Kim

(10) Patent No.: US 7,707,689 B2
(45) Date of Patent: May 4, 2010

(54) MOBILE COMMUNICATION TERMINAL HAVING A HINGE-REINFORCING MEMBER

(75) Inventor: Jong Wun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 240 days.

(21) Appl. No.: 11/619,278

(22) Filed: Jan. 3, 2007

(65) Prior Publication Data

US 2007/0155238 A1 Jul. 5, 2007

(30) Foreign Application Priority Data

Jan. 5, 2006 (KR) .................... 10-2006-0001340

(51) Int. Cl.
*E05C 17/64* (2006.01)

(52) U.S. Cl. .................... 16/342; 16/254; 16/263; 16/267; 16/356; 379/433.13

(58) Field of Classification Search ............ 16/342, 16/387, 389, 254, 260, 263, 267, 356, 337, 16/383; 439/165, 31, 467; 455/575.3; 379/433.11, 379/433.12, 433.13; 361/679.06, 679.07, 361/679.11, 679.12, 679.15, 679.16, 697.2, 361/679.27, 679.28

See application file for complete search history.

(56) References Cited

U.S. PATENT DOCUMENTS

| 5,333,356 | A | * | 8/1994 | Katagiri | 16/340 |
| 5,572,769 | A | * | 11/1996 | Spechts et al. | 16/337 |
| 5,682,645 | A | * | 11/1997 | Watabe et al. | 16/338 |
| 6,085,388 | A | * | 7/2000 | Kaneko | 16/338 |
| 6,609,272 | B1 | * | 8/2003 | Lee | 16/307 |
| 6,820,307 | B2 | * | 11/2004 | Lu | 16/342 |
| 7,380,312 | B2 | * | 6/2008 | Ge et al. | 16/342 |
| 7,404,234 | B2 | * | 7/2008 | Lee et al. | 16/322 |
| 2003/0172497 | A1 | * | 9/2003 | Cha | 16/342 |
| 2004/0134033 | A1 | * | 7/2004 | Raines et al. | 16/342 |

FOREIGN PATENT DOCUMENTS

JP 05086766 A * 4/1993

* cited by examiner

*Primary Examiner*—Victor Batson
*Assistant Examiner*—Jeffrey O'Brien
(74) *Attorney, Agent, or Firm*—Lee, Hong, Degerman, Kang & Waimey

(57) ABSTRACT

A folder-type communication terminal is disclosed in which a gap generated between a first and a second body or a breakage of a side hinge arm can be reduced. The mobile communication terminal includes a first body and a second body rotatably coupled using a hinge, and at least one hinge-reinforcing member disposed between the hinge members of the first and the second bodies.

13 Claims, 5 Drawing Sheets

(Center Hinge)

(Side Hinge)

(Side Hinge)

MOBILE COMMUNICATION TERMINAL HAVING A HINGE-REINFORCING MEMBER

CROSS REFERENCE TO RELATED APPLICATION

This application claims the benefit of the Korean Patent Application No. 10-2006-0001340, filed on Jan. 5, 2006, which is hereby incorporated by reference as if fully set forth herein.

BACKGROUND OF THE INVENTION

1. Field of the Invention

The present invention relates to a mobile communication terminal, and more particularly, to a side hinge, folder-type mobile communication terminal wherein a side hinge of a second body attaches into a center hinge arm of a first body. Although the present invention is suitable for a wide scope of applications, it is particularly suitable for preventing a breakage of the second body by locking a hinge-reinforcing member of a prescribed shape to the side hinge arm.

2. Discussion of the Related Art

Recently, the demand for mobile communication terminals ("terminal") has risen due to convenience of use. The terminals have been reduced in size and have been provided with multi-functions to meet user's demands.

Terminals include a bar-type terminal (an early model having externally exposed number and function keys without a separate case), a flip-type terminal having a case configuring a body and a second case separately attached to the body, a folder-type terminal having a second body hinged on an upper surface of a first body, and a slide-type terminal having a slide cover slide on a terminal body.

As mentioned in the foregoing description, the functions of a mobile communication terminal have expanded to include e-mail reception, video viewing, camera, etc. The size and weight of a terminal also has been reduced to enhance portability. In meeting these requirements, folder or slide-type mobile communication terminals have become more popular. In particular, a wide-screen LCD can be viewed if the folder or slide-type mobile communication terminal is open. The folder or slide-type mobile communication terminal is advantageous for its small size.

FIG. 1 is a perspective diagram of a folder-type mobile communication terminal having a center hinge structure according to a related art; FIG. 2 is a perspective diagram of a folder-type mobile communication terminal having a side hinge structure according to a related art; and FIG. 3 is a magnified perspective view of the folder-type mobile communication terminal having the side hinge structure shown in FIG. 2 to explain a rotational problem with the second body.

Referring to FIG. 1, a center hinge, folder-type mobile communication terminal consists of a first body 1 and a second body 2.

A keypad 1a, including number keys and various function keys, is provided to an upper surface of the first body 1. A microphone 1b is provided at a lower end of the upper surface of the first body 1. A pair of side hinge arms 1c are provided to an upper end of the upper surface of the first body 1 to be spaced apart from each other. An antenna 1d is provided to a top end of the first body 1.

A center hinge arm 2a is projected from a center of a lower end of the second body 2. An LCD window 2b is provided on the second body 2, and a speaker 2c is provided at an upper end of the second body 2.

The first and second bodies 1 and 2 are rotatably hinged together in a manner that the center hinge arm 2a is placed between a pair of the side hinge arms 1c to enable the second body 2 to rotate within a predetermined angle range.

Referring to FIG. 2, a side hinge, folder-type mobile communication terminal consists of a first body 10 and a second body 20.

A center hinge arm 10c is projected from a center of an upper end of the first body 10. A pair of side hinge arms 20a is formed at both sides of a lower end of the second body 20. The first and second bodies are rotatably hinged together in a manner that a pair of the side hinge arms 20 are placed at both ends of the center hinge arm 10c, respectively, to enable the second body 20 to rotate within a prescribed angle range.

Referring to FIG. 2 and FIG. 3, in the side hinge-type, if the second body 20 is forced open by an unnecessarily excessive force to unfold the terminal, the engaged part between the center hinge arm 10c of the first body 10 and each of a pair of the side hinge arms 20a is widened to generate a gap in between in the vicinity of an area 'A' indicated by an arrow shown in FIG. 3.

However, in case that an unnecessary tensile force keeps being applied to the engaged part to open the second body 20, the engaged part keeps getting wider to eventually break the side hinge arms 20a of the second body 20.

SUMMARY OF THE INVENTION

Accordingly, the present invention is directed to a mobile communication terminal that substantially obviates one or more problems due to limitations and disadvantages of the related art.

An object of the present invention is to provide a terminal, by which a gap between first and second bodies of a folder-type terminal or a breakage of a side arm hinge part can be reduced.

Additional advantages, objects, and features of the invention will be set forth in part in the description which follows and in part will become apparent to those having ordinary skill in the art, upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a terminal according to the present invention includes a first body having a center hinge, a second body having at least one hinge side arm, and at least one hinge reinforcing member affixed to at least one hinge side arm for rotatably coupling with the center hinge of the first body.

Preferably, at least one hinge-reinforcing member includes a tab for securing to at least one hinge side arm and a head portion transversely extending from the tab, wherein the head portion generally has the shape of an open cylinder having a uniform interior diameter and has an opening extending longitudinally along and through its surface.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
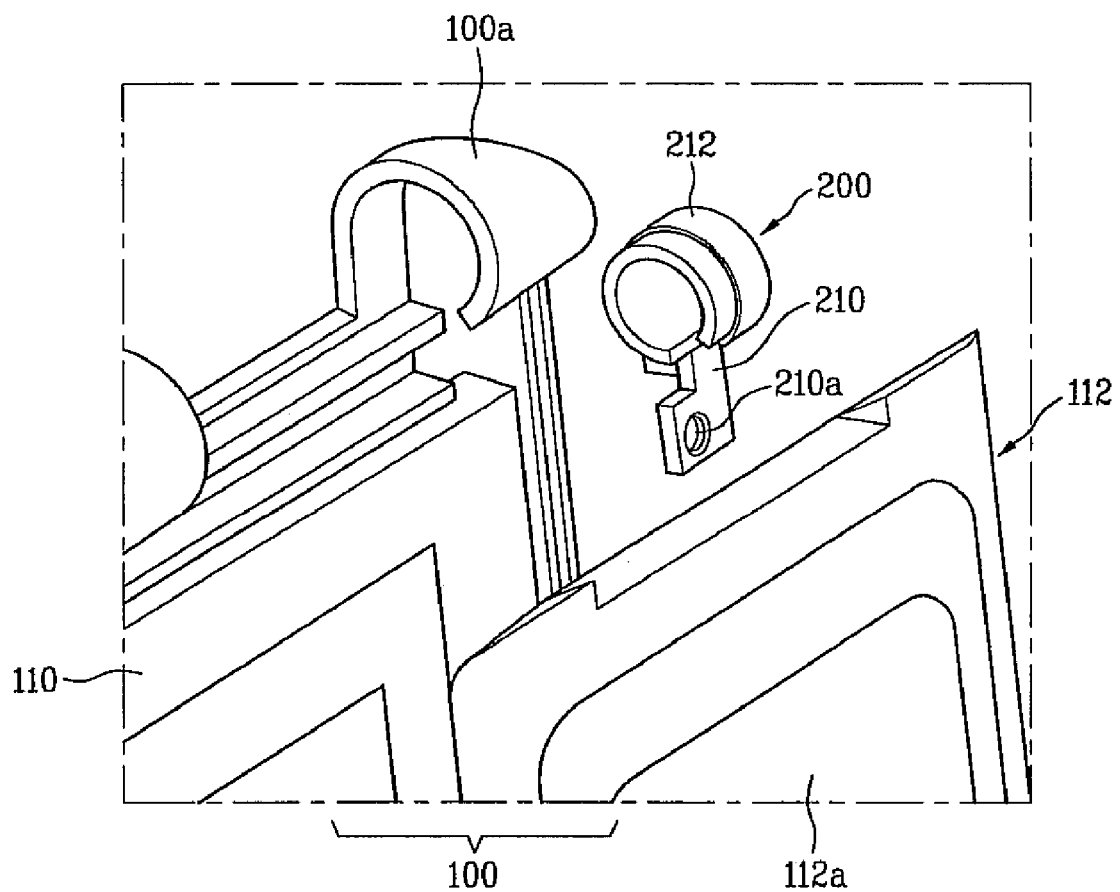
FIG. 4 is an exploded perspective diagram of a terminal according to one embodiment of the present invention showing a hinge reinforcing member.
Figure 5:
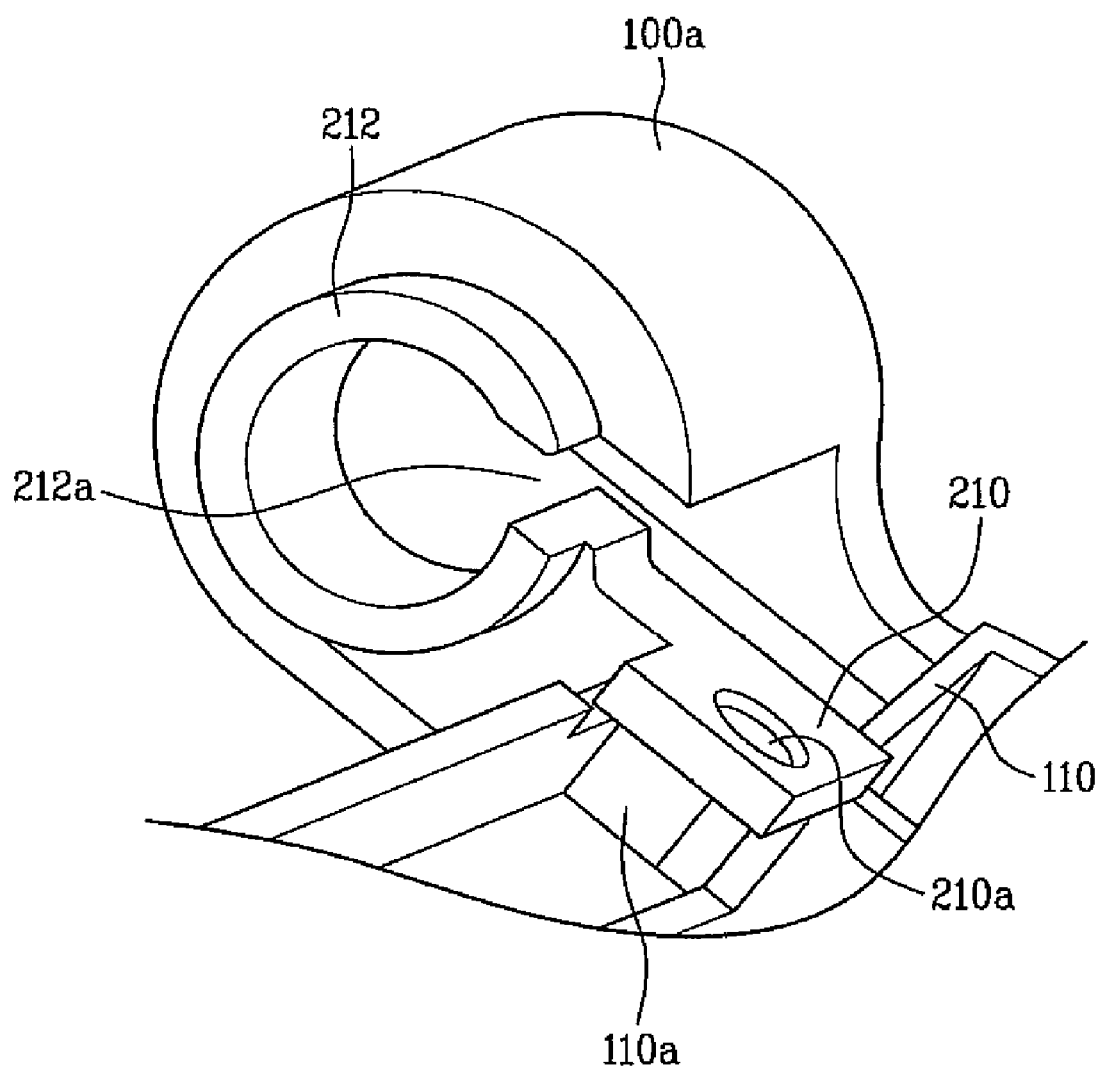
FIG. 5 is a magnified diagram of a hinge reinforcing member of a terminal according to one embodiment of the present invention.

FIG. 4 is an exploded perspective diagram of a terminal according to one embodiment of the present invention showing a hinge-reinforcing member; and FIG. 5 shows a hinge-reinforcing member according to one embodiment of the present invention.

Referring to FIG. 4 and FIG. 5, a hinge reinforcing member 200 is locked to a side hinge arm 100a of a second body 100. The hinge-reinforcing member 200 includes a body part 210 and an arm fitting part 212 extending from an upper end of the body part 210.

The arm fitting part 212 has a "C"-type cross section. A screw hole 210a is formed at one side of the body part 210. A screw as a locking means (not shown in the drawings) is locked into a screw boss 110a (shown on FIG. 5) projected from one end of a lower case 110 of the second body 100 via the screw hole 210a.

The arm-fitting part 212 extends from the upper end of the body part 210 in a perpendicular direction to the screw locking direction of the body part 210 to facilitate the second body 100 to be fitted into the side hinge arm 100a. An opening 212a is formed at one side of the arm-fitting part 212 to facilitate attachment/detachment to/from the side hinge arm 100a. Hence, the arm fitting part 212 has a "C"-type cross section overall. One half of the arm-fitting part 212 differs from the other half in thickness so that the thicker half of the arm-fitting part 212 is fitted into a predetermined portion of the side hinge arm 100a of the second body 100.

Preferably, the hinge-reinforcing member 200 is formed of a synthetic resin material having a prescribed thickness to reduce its weight and to facilitate engaging the second body 100. In FIG. 4 or FIG. 5, one hinge-reinforcing member 200 is fitted into the side hinge arm 100a. Yet, to maximize the breakage preventing function of the second body 100, the hinge-reinforcing member 200 is locked to each of the side hinge arms 100a of the second body 100, respectively. Reference numbers 112 and 112a in FIG. 4 indicate an upper case and an LCD window, respectively.

The operation of the hinge-reinforcing member is explained with reference to FIG. 4 and FIG. 5 as follows.

First of all, the body part 210 of the hinge-reinforcing member 200 is locked to the screw boss 110a at one end of the lower case 110 of the second body 100 using a screw. The arm-fitting part 212 of the hinge-reinforcing member 200 is fitted into the side hinge arm of the second body 100 to be fixed thereto.

Figure 1:
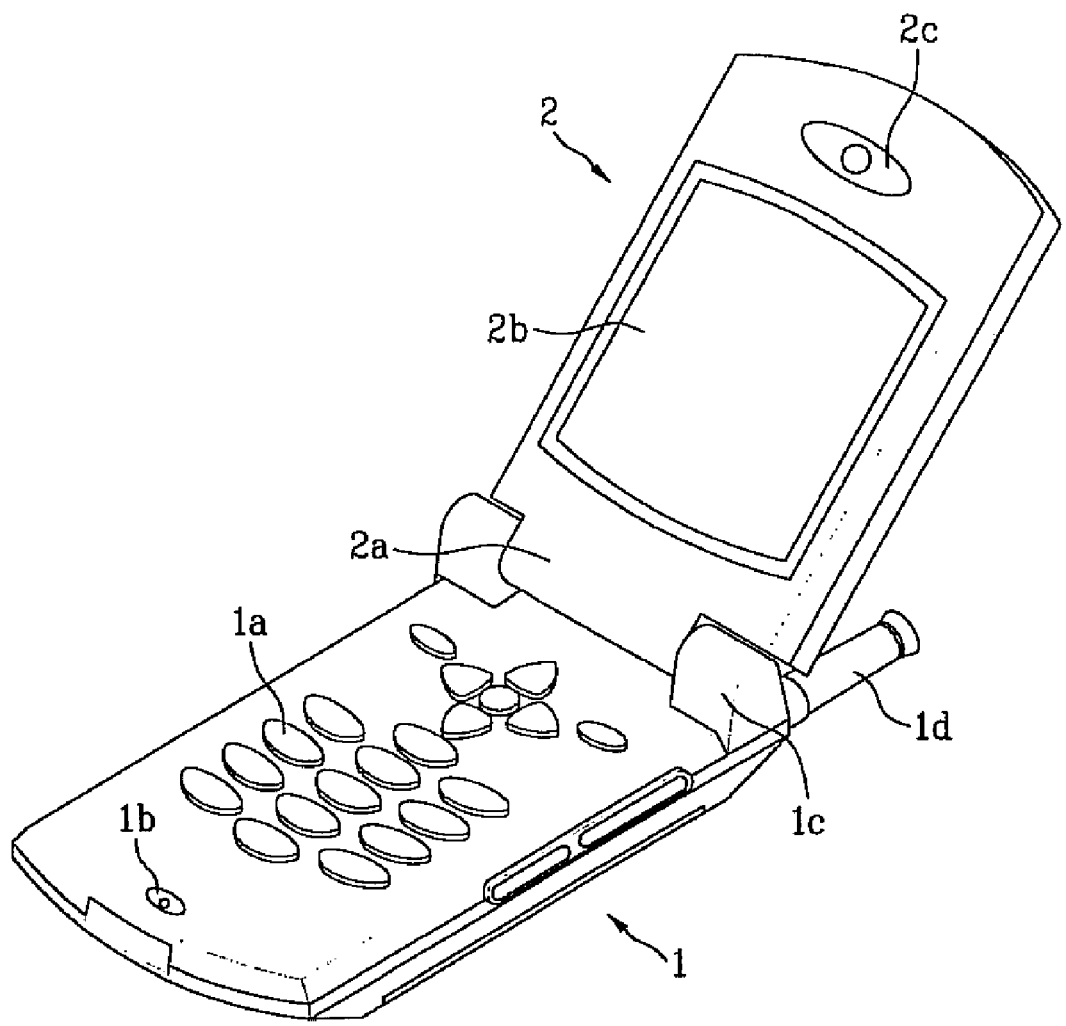
FIG. 1 is a perspective diagram of a folder-type mobile communication terminal having a center hinge structure according to a related art.
Figure 2:
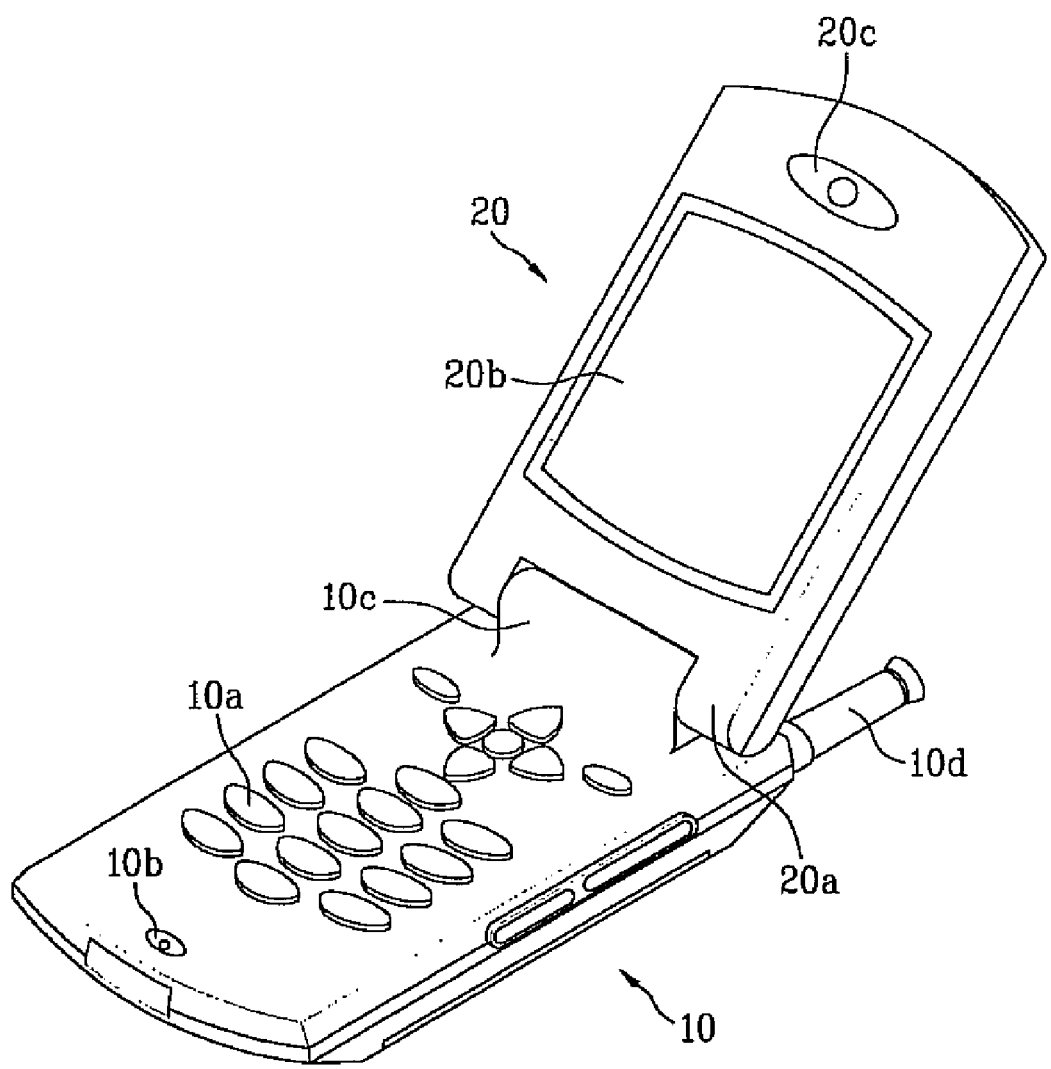
FIG. 2 is a perspective diagram of a folder-type mobile communication terminal having a side hinge structure according to a related art.
Figure 3:
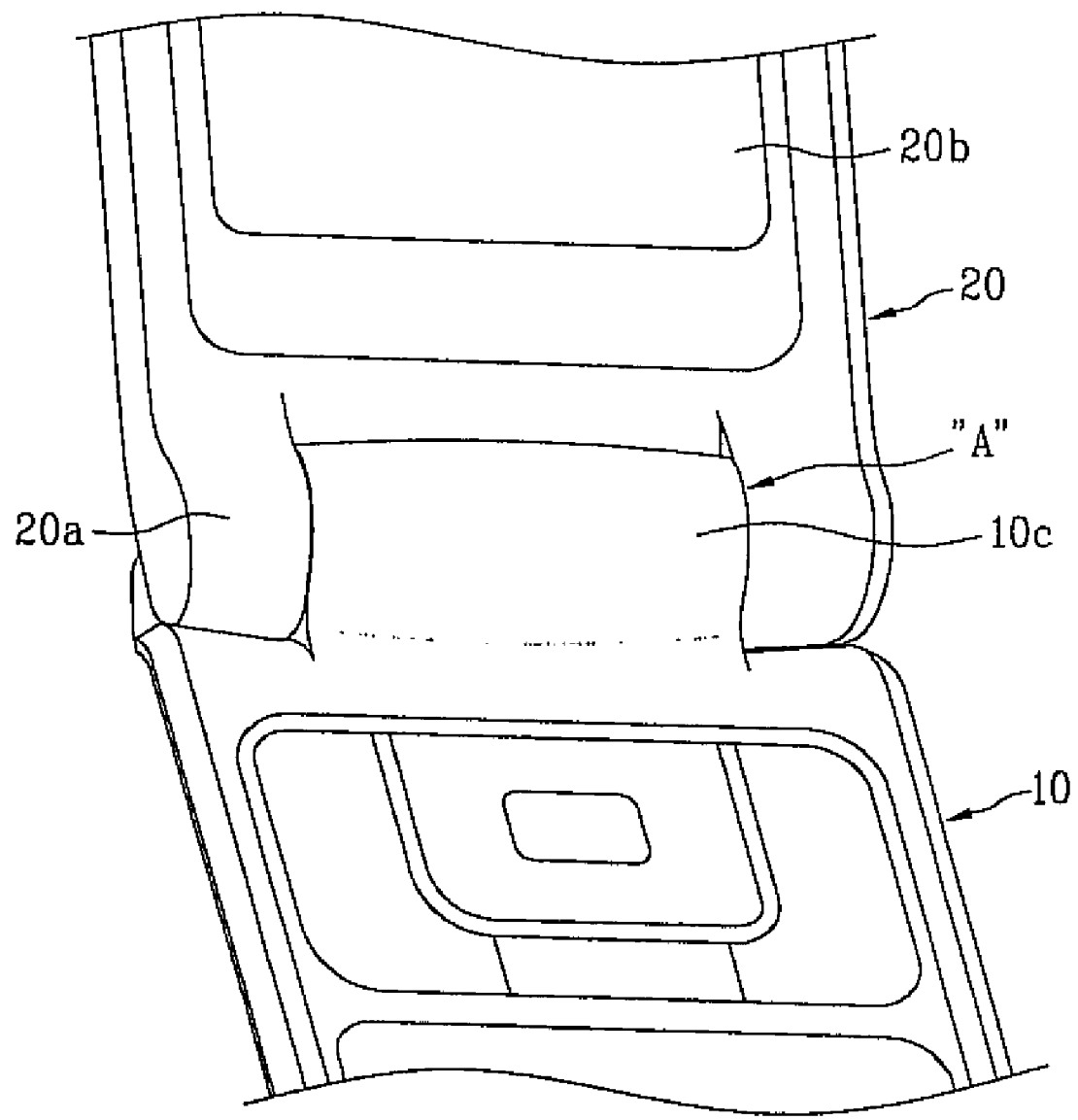
FIG. 3 is a magnified perspective view of the folder-type mobile communication terminal having the side hinge structure shown in FIG. 2 to explain a rotational problem of a second body.

In doing so, the arm-fitting part 212 of the hinge-reinforcing member 200 can easily attached/detached to/from the side hinge arm 100a of the second body 100. Once an assembly of the second body 100 is completed by assembling the upper case 112 to the lower case 110 having the hinge-reinforcing member 200 provided thereto, the center hinge-type mobile communication terminal is then assembled in a manner that the side hinge arms 100a of the second body 100 are placed at both ends of the center hinge arm 10c of the first body 10 (FIG. 3), respectively.

When one or more hinge-reinforcing members 200 are fitted to the side hinge arms 100a of the second body 100, even if an excessive force is unnecessarily applied to the second body 100 to open, repetitive tensile forces at the engaged part between the center hinge arm 10c and the side hinge arm 100a of the second body 100 are reduced by the arm fitting part 212.

Hence, the generation of the gap occurring in the engaged part between the center hinge arm 10c and the side hinge arm 100a or the breakage of the side hinge arm 100a of the second body 100 can be reduced. Accordingly, the present invention can reduce the gap occurrence between the first and second bodies of the folder-type mobile communication terminal or the breakage of the side hinge arm part of the second body using the at least one hinge-reinforcing member provided to the side hinge arm of the second body.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

I claim:

1. A mobile communication terminal comprising:
a first body having a center hinge;
a second body having at least one hinge side arm with a round opening; and
at least one hinge-reinforcing member affixed to the at least one hinge side arm,
wherein the at least one hinge-reinforcing member is integrally formed with a tab portion for securing to the at least one hinge side arm and a head portion transversely extending from the tab portion,
wherein a first end of the head portion is directly connected to a first end of the tab portion and a second end of the head portion is not directly connected to the tab portion nor bound by the tab portion,
wherein the head portion has a shape of an open cylinder having a uniform interior diameter with an opening extending longitudinally along and through the surface of the head portion to facilitate attachment to and detachment from the at least one hinge side arm,
wherein the head portion comprises a first longitudinal portion and a second longitudinal portion, and the first longitudinal portion is thicker than the second longitudinal portion,
wherein only the first longitudinal portion of the head portion is extended from the tab portion and the second longitudinal portion of the head portion is extended from the first longitudinal portion, and wherein the first longitudinal portion is fitted into the round opening of the at least one hinge side arm and the second longitudinal portion is rotatably coupled to the center hinge of the first body.

2. The terminal of claim 1, wherein the tab portion is secured to the at least one hinge side arm with a screw.

3. The terminal of claim 2, wherein a screw hole is formed in the tab portion for receiving the screw to secure the at least one hinge-reinforcing member to the at least one hinge side arm.

4. The terminal of claim 1, wherein the at least one hinge-reinforcing member is formed of one of a synthetic resin material, metal, and nylon.

5. A mobile communication terminal comprising:

a first body having a center hinge;

a second body having a left hinge side arm and a right hinge side arm, each of the left hinge side arm and the right hinge side arm having a round opening; and a hinge-reinforcing member affixed to each of the left hinge side arm and the right hinge side arm, wherein the hinge-reinforcing member is integrally formed with a tab portion for securing to at least one of the left hinge side arm and the right hinge side arm and a head portion transversely extending from the tab portion, wherein a first end of the head portion is directly connected to a first end of the tab portion and a second end of the head portion is not directly connected to the tab portion nor bound by the tab portion, wherein the head portion has a shape of an open cylinder having a uniform interior diameter with an opening extending longitudinally along and through the surface of the head portion, wherein the head portion comprises a first longitudinal portion and a second longitudinal portion, and the first longitudinal portion is thicker than the second longitudinal portion, wherein only the first longitudinal portion of the head portion is extended from the tab portion and the second longitudinal portion of the head portion is extended from the first longitudinal portion, and wherein the first longitudinal portion is fitted into the round opening of the at least one of the left hinge side arm and the right hinge side arm, and the second longitudinal portion is rotatably coupled to the center hinge of the first body.

6. The terminal of claim 5, wherein the tab portion is secured to at least the left hinge side arm or right hinge side arm with a screw.

7. The terminal of claim 6, wherein a screw hole is formed in the tab portion for receiving the screw to secure the hinge-reinforcing member to at least the left hinge side arm or right hinge side arm.

8. The terminal of claim 5, wherein the hinge-reinforcing member is formed of one of a synthetic resin material, metal, and nylon.

9. A hinge-reinforcing member for use in a mobile communications terminal, the hinge-reinforcing member comprising:

a tab portion for securing to at least one hinge side arm of a second body of the mobile communication terminal; and a head portion transversely extending from and integrally formed with the tab portion, wherein a first end of the head portion is directly connected to a first end of the tab portion and a second end of the head portion is not directly connected to the tab portion nor bound by the tab portion, wherein the head portion has a shape of an open cylinder having a uniform interior diameter, and has an opening extending longitudinally along and through its surface to facilitate attachment to and detachment from the at least one hinge side arm, wherein the head portion comprises a first longitudinal portion and a second longitudinal portion, and the first longitudinal portion is thicker than the second longitudinal portion, and wherein only the first longitudinal portion of the head portion is extended from the tab portion and the second longitudinal portion of the head portion is extended from the first longitudinal portion.

10. The hinge-reinforcing member of claim 9, wherein the tab portion is secured to the at least one hinge side arm with a screw.

11. The hinge-reinforcing member of claim 10, wherein a screw hole is formed in the tab portion for receiving the screw.

12. The hinge-reinforcing member of claim 9, wherein the hinge-reinforcing member is formed of one of a synthetic resin material, metal, and nylon.

13. The terminal of claim 1, wherein the at least one hinge side arm is roundly extended from the second body forming the round opening.

* * * * *